(12) United States Patent
Okoniewska et al.

(10) Patent No.: US 11,889,840 B2
(45) Date of Patent: Feb. 6, 2024

(54) BREAKFAST BISCUIT WITH SLOWLY AVAILABLE GLUCOSE

(71) Applicant: Generale Biscuit, Clamart (FR)

(72) Inventors: Monika Okoniewska, East Hanover, NJ (US); Isabel Moreira De Almeida, Saclay (FR); Agathe Arlotti, Saclay (FR); Lionel Lanvin, Saclay (FR); Jérôme Clément, Saclay (FR); Gautier Cesbron Lavau, Saclay (FR)

(73) Assignee: GENERALE BISCUIT, Clamart (FR)

( * ) Notice: Subject to any disclaimer, the term of this patent is extended or adjusted under 35 U.S.C. 154(b) by 0 days.

(21) Appl. No.: 15/026,733

(22) PCT Filed: Oct. 3, 2014

(86) PCT No.: PCT/US2014/059012
§ 371 (c)(1),
(2) Date: Apr. 1, 2016

(87) PCT Pub. No.: WO2015/051236
PCT Pub. Date: Apr. 9, 2015

(65) Prior Publication Data
US 2016/0235075 A1 Aug. 18, 2016

Related U.S. Application Data

(60) Provisional application No. 61/887,008, filed on Oct. 4, 2013.

(51) Int. Cl.
*A21D 13/062* (2017.01)
*A21D 13/02* (2006.01)
*A23L 33/22* (2016.01)

(52) U.S. Cl.
CPC ........... *A21D 13/062* (2013.01); *A21D 13/02* (2013.01); *A23L 33/22* (2016.08)

(58) Field of Classification Search
CPC ........ A21D 13/062; A21D 13/02; A23L 33/22
USPC ....... 426/549, 615, 618, 619, 620, 621, 622, 426/629, 658
See application file for complete search history.

(56) References Cited

U.S. PATENT DOCUMENTS

| | | | | |
|---|---|---|---|---|
| 4,431,674 | A | * | 2/1984 | Fulger ...................... A23L 7/117 426/18 |
| 4,603,055 | A | * | 7/1986 | Karwowski ............. A23L 7/148 426/457 |
| 6,488,957 | B1 | | 12/2002 | Koumarianos |
| 2003/0161861 | A1 | | 8/2003 | Lang |
| 2007/0087084 | A1 | | 4/2007 | Coleman |
| 2008/0317932 | A1 | | 12/2008 | Long et al. |
| 2010/0151105 | A1 | | 6/2010 | Kameo |
| 2010/0303991 | A1 | | 12/2010 | Karwowski et al. |
| 2011/0229602 | A1 | | 9/2011 | Aymard et al. |
| 2013/0266717 | A1 | | 10/2013 | Couttenye |
| 2013/0287920 | A1 | | 10/2013 | Couttenye |

FOREIGN PATENT DOCUMENTS

| | | | |
|---|---|---|---|
| EP | 1362517 A1 | | 11/2003 |
| JP | 2010-279352 A | | 12/2010 |
| WO | 2007095977 A1 | | 8/2007 |
| WO | WO 2012/120154 A2 | * | 9/2012 |
| WO | 2012155154 A2 | | 11/2012 |
| WO | 2014152037 A1 | | 9/2014 |

OTHER PUBLICATIONS

Skrabanja et al., Nutritional properties of starch in buckwheat products: studies in vitro and in vivo, J. Agric. Food Chem. 2001, vol. 49, No. 1, pp. 49-496.*
Cole Parmer's Food Tech Source, Water Activity, www.foodtechsource.com, 2002.*
Banwart, G.J., Basic Food Microbiology, AVI Wesport, CT, 1981, p. 82.*
Romero, M., The Powerful Health Benets of Buckwheat, 2012, Washingtonian.*
Canadian Official Action for CA 2,923,633, dated Apr. 10, 2017.
Canadian Official Action for CA 2,923,633, dated Jan. 8, 2018.
Canadian Official Action for CA 2,923,635, dated Apr. 10, 2017.
Canadian Official Action for CA 2,923,635, dated Jan. 11, 2018.
USPTO Office Action for U.S. Appl. No. 15/026,730, dated Aug. 23, 2018.
Angioloni et al. J. Sci. Food Agric., 2011, vol. 91, p. 1283-1292.
Ritika et al., Int. Food Res. J., 2010, vol. 17, p. 1067-1076.
Garsetti et al., J. American College of Nutrition, vol. 24, No. 6, Jan. 1, 2005, pp. 441-447.
International Preliminary Report on Patentability, PCT/US2014/059012, dated Dec. 22, 2014.
International Preliminary Report on Patentability, PCT/US2014/058989, dated Dec. 19, 2014.
Buckwheat cookie, Cookpad, Jul. 7, 2009, http://cookpad.com/recipe/856099 (English translation).
Buckwheat cookie, Cookpad, Feb. 23, 2009, http://cookpad.com/recipe/734070 (English translation).
Buckwheat buscuit, Cookpad, Mar. 3, 2003, http://cookpad.com/recipe/82041 (English translation).
Extended European Search Report, EP 14851006.8, dated Mar. 24, 2017.
Extended European Search Report, EP 14851385.6, dated Mar. 24, 2017.
Notification of Reasons for Refusal, Japanese Patent Application No. 2016-516872, dated Sep. 22, 2017 (English translation).

(Continued)

*Primary Examiner* — Leslie A Wong
(74) *Attorney, Agent, or Firm* — Morgan, Lewis & Bockius LLP

(57) ABSTRACT

Methods and products related to a baked cereal product having an SAG content of greater than about 15 g per 100 g of the baked cereal product, a moisture level of less than about 5 wt % of the baked cereal product, and seeds.

24 Claims, No Drawings

(56) References Cited

OTHER PUBLICATIONS

Notification of Reasons for Refusal, Japanese Patent Application No. 2016-516872, dated Dec. 15, 2016 (English translation).
Reconsideration Report, Japanese Patent Application No. 2016-517414, dated Mar. 26, 2018 (English translation).
Decision of Refusal, Japanese Patent Application No. 2016-517414, dated Sep. 1, 2017 (English translation).
Official Action, Japanese Patent Application No. 2016-517414, dated Jan. 27, 2017 (English translation).
Japanese Decision of Refusal for Appl. No. 2016-516872; dated Aug. 28, 2018; 8 pages.
English machine translation of Japanese Decision of Refusal for Appl. No. 2016-516872; dated Aug. 28, 2018; 6 pages.
Notice of Reasons for Rejection, Japanese Patent Application No. 2016-517414, dated Sep. 20, 2018; 3 pages.
Notice of Reasons for Rejection, Japanese Patent Application No. 2016-517414, dated Sep. 20, 2018 (English translation); 3 pages.
Japanese Decision of Refusal for Appl. No. 2016-516872; dated Aug. 23, 2018; 8 pages.
MultiLing translation of Japanese Decision of Refusal for Appl. No. 2016-516872; dated Aug. 23, 2018; 6 pages.
CN 201480053604 First Office Action; 9 pages.
CN 201480053604 Second Office Action; 10 pages.
Table 4-1 of D3 cited in CN 201480053604 First Office Action; 1 page.
Reasons for Refusal for JP 2018-17520; dated Oct. 30, 2019; 22 pages.
English translation of Reasons for Refusal for JP 2018-17520; dated Oct. 30, 2019; 18 pages.
Brazillian Office Action for BR1120160006623-5; 4 pages.
English translation of Brazillian Office Action for BR1120160006623-5; 2 pages.
Baljeet S. Y. et al.; "Studies on functional properties and incorporation of buckwheat flour for biscuit making"; International Food Research Journal (Jan. 2010) 17 (4), pp. 1067-1076***; https//www.researchgate.net/publication/27618892_Studies_on_functional_properties_and_incorporation_of_buckwheat_flour_for_biscuit_making.
Written Opinion for JP 2018-247269; dated Apr. 27, 2020; 1 page.
English Translation of Written Opinion for JP 2018-247269; dated Apr. 27, 2020; 2 pages.
Notice of Reasons for Refusal for JP 2018-247269; dated Nov. 5, 2019; 2 pages.
English translation of Notice of Reasons for Refusal for JP 2018-247269; dated Nov. 5, 2019; 2 pages.
European Patent Office Communication for EP 14851006.8; dated Jan. 27, 2021; 2 pages.
Annex to the European Patent Office Communication for EP 14851006.8; dated Jan. 27, 2021; 2 pages.
Anonymous; "Chocolate Chip Cookies with Buckwheat Groats", Jan. 17, 2012, pp. 1-1, XP055767805, Retrieved from the Internet: URL:https://www.thewednesdaychef.com/the_wednesday_chef/2008/11/chocolate-chip.html [retrieved on Apr. 26, 2021].
BR Office Action dated Aug. 10, 2021 for BR Patent Application No. BR11206006623-5; 13 pages.
Chinese Decision of Rejection for CN 201480053604.0; dated Nov. 19, 2019; 8 pages.
Xu Zong et al., "Functional Modified Starch"; China Light Industry Press, 1st Edition, 1st Print in Apr. 2010, pp. 68-70; 3 pages.
Japanese Office Action for JP 2018-247269; dated Sep. 29, 2020; 4 pages.

* cited by examiner

BREAKFAST BISCUIT WITH SLOWLY AVAILABLE GLUCOSE

CROSS-REFERENCE TO RELATED APPLICATIONS

This application is a U.S. National Stage Entry of International Patent Application No. PCT/US2014/059012, filed Oct. 3, 2014, which in turn claims the benefit of U.S. Provisional Patent Application No. 61/887,008 filed Oct. 4, 2013 entitled "Breakfast Biscuit With Slowly Available Glucose", which are incorporated by reference herein in their entirety.

BACKGROUND OF THE INVENTION

The present invention relates to food products containing slowly available glucose.

BRIEF SUMMARY OF THE INVENTION

According to some embodiments of the present invention, a baked cereal product includes an SAG content of greater than about 15 g per 100 g of the baked cereal product, a moisture level of less than about 5 wt % of the baked cereal product, and seeds.

In some embodiments, the seeds include buckwheat, which may include buckwheat grits, groats, cuts, or combinations thereof.

In some embodiments, the baked cereal product has an SAG content of greater than about 17 g per 100 g of baked cereal product. In certain embodiments, the baked cereal product has a ratio of SAG to available starch of about 40% or greater. The cereal product may have an unbaked SAG content and a post-baked SAG content, and in some embodiments, the post-baked SAG content is less than about 25% below the unbaked SAG content; or less than about 10% below the unbaked SAG content.

In some embodiments, the baked cereal product is dough-based. In some embodiments, the baked cereal product further includes inclusions such as fruit, grains, oats, rye flakes and/or chocolate chips. In certain embodiments, the cereal product includes protein in an amount of about 0.1 wt % to about 20 wt % of the weight of the cereal product, and/or fat in an amount of about 0.1 wt % to about 20 wt % of the weight of the cereal product.

According to some embodiments of the present invention, a method for preparing a baked cereal product includes preparing a dough comprising seeds; forming the dough to provide a dough piece; and baking the dough piece to provide a baked cereal product having a moisture content of less than about 5 wt % and such that the baked cereal product has a post-baked SAG content of at least about 15 g per about 100 g of the baked cereal product.

DETAILED DESCRIPTION OF THE INVENTION

Methods and compositions of some embodiments of the present invention relate to cereal products containing slowly available glucose ("SAG"). SAG refers to the amount of glucose (from sugar and starch, including maltodextrins) likely to be available for slow absorption in the human small intestine. In the present case of the disclosure, the slowly digestible starch ("SDS") content equals the SAG content because there is no other SAG source than starch, i.e. SDS. Rapidly available glucose (RAG) refers to the amount of glucose likely to be available for rapid absorption in the human small intestine.

SAG, as used herein, is defined and measured according to the Englyst method (as described, for example, in "Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; and "Measurement of Rapidly Available Glucose (RAG) in Plant Foods: a Potential In Vitro Predictor of the Glycaemic Response", Englyst et al., Br. J. Nutr., 1996(3), 75(3), 327-337 each of which is incorporated by reference in their entirety herein).

SAG content in a cereal product may be controlled by the formulation of the cereal product as well as the processing conditions involved in preparing the cereal product. In some embodiments, a cereal product with desired levels of SAG provides a beneficial effect in maintaining blood glucose levels over extended time. As used herein, an unbaked cereal product refers to a prepared, formed dough, prior to baking. An unbaked SAG content refers to the SAG content in the unbaked cereal product. A baked SAG refers to the SAG content in the baked cereal product. As used herein, a baked cereal product refers to cereal products prepared by baking, drying, or any other process which utilizes heat as an aspect of the processing. As used herein, a cereal product refers to a food product including cereal and/or pseudocereal, as described below.

SAG content in a baked product may be associated with the presence of ungelatinized starch. During processing of a cereal product, gelatinization of starch reduces the SAG content.

Because processing conditions may damage starch and thereby allow increased gelatinization, one established method of increasing SAG in a baked product is to use low shear processing conditions. In some embodiments, processing conditions are chosen to minimize damage to the starch in the cereal product formulation. Additionally, starch gelatinization substantially increases in the presence of moisture. As a result, another established method of increasing SAG in a baked product is to use a minimal amount of water in a cereal product formulation; using lower amounts of water may result in lower levels of starch gelatinization, and therefore higher SAG levels in the finished product.

While using low-shear processing conditions and reducing moisture have been shown to provide a product with increased SAG, such methods may place restrictions on the ability to easily prepare a cereal product with high SAG levels. Low-shear processing conditions may be time-consuming and inefficient, and very low-moisture doughs may have a rheology which is difficult to process.

Surprisingly, it has been found that certain ingredients may resist starch damage and/or increased gelatinization due to standard processing conditions including shear, heat, and moisture. This resistance allows such ingredients to maintain a higher SAG level in the baked cereal product, while being prepared with more efficient processes and less challenging dough rheology. In some embodiments, such ingredients may be used in processes involving low shear, low heat, and/or low moisture conditions to provide an even further increase in SAG levels of the baked cereal product.

In some embodiments, a baked cereal product of the present invention may contain seeds, such as buckwheat, and have an SAG of greater than about 15 g per 100 g of baked cereal product with a moisture level of less than about 5 wt % of the baked cereal product. Formulations and methods of embodiments of the present invention are discussed in further detail below.

Cereal Product

Cereal products of some embodiments of the present invention may be formulated to include desired levels of SAG. In some embodiments, the cereal product includes desired proportions of carbohydrates, fats, and proteins. In some embodiments, higher SAG values are associated with the presence of ungelatinized starch. Starch gelatinization may enable starch to be more easily digested and therefore reduce the SAG in the final product.

Cereal products according to embodiments of the present invention can take on any suitable form, including but not limited to biscuits, miniature biscuits, cookies, sandwich cookies, iced cookies, cakes, breads, rolls, pastries, bars or other baked goods.

Carbohydrates

Carbohydrates may be present in the cereal product in the form of sugars, sugar alcohols, oligosaccharides, polysaccharides, including starch fractions and non-starch polysaccharides. It has been found that certain carbohydrate ingredients provide desired levels of SAG. In some embodiments, certain carbohydrate ingredients provide a desired texture, in addition to desired levels of SAG.

In some embodiments, carbohydrates are provided from sources including but not limited to whole grains, flour, flakes, grits, cuts from various cereals or pseudocereals, for example, wheat, oats, rye, barley, spelt, millet, sorghum, kamut, triticale, buckwheat, quinoa, and/or amaranth. In some embodiments, carbohydrates are provided from whole grains. All the cereals or pseudo cereals can be whole grain and whole grains can be used in variety of forms for example, in the form of flour, flakes, grits, or cuts. Combinations of all grains, pseudocereals, and variety of their forms can be included in the formulation.

A complete list of cereal and pseudocereal flours can be found in the definition of "whole grains" based on AACC International Whole Grain Task Force. See, AACC International, www.aacc.net.org/definitions/wholegrain, which is incorporated by reference herein in its entirety. The definition states that, "Cereals are generally considered to be the seed heads of grasses from the Poaceae (synonymous with Gramineous) family. Pseudocereals are seed heads of a number of different species of plants that do not belong to the grass family and do not include legumes or oilseeds. The Task Force decided that the pseudocereals should be included with the cereals because the grain heads of pseudocereals are used in the same traditional ways that cereals are used, such as in the making of bread, starch staples and side dishes. In addition, the overall macronutrient composition (proportions of carbohydrate, protein and fat) of cereals and pseudocereals is similar."

In some embodiments, the cereal product contains no, or substantially no, carbohydrates from corn starch or modified corn starch.

In some embodiments, a cereal product contains carbohydrates in an amount of about 40 wt % to about 95 wt % of the cereal product; about 45 wt % to about 90 wt % of the cereal product; about 50 wt % to about 90 wt % of the cereal product; about 55 wt % to about 85 wt % of the cereal product; about 60 w % to about 80 wt % of the cereal product; about 65 wt % to about 75 wt % of the cereal product; about 50 wt % of the cereal product; about 55 wt % of the cereal product; about 60 wt % of the cereal product; about 65 wt % of the cereal product; about 70 wt % of the cereal product; about 80 wt % of the cereal product; about 85 wt % of the cereal product; about 90 wt % of the cereal product; or about 95 wt % of the cereal product.

In some embodiments, a cereal product includes starch in an amount of at least about 10 wt % of the cereal product; at least about 15 wt % of the cereal product; at least about 20 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; about 10 wt % to about 75 wt % of the cereal product; about 10 wt % to about 65 wt % of the cereal product; about 10 wt % to about 55 wt % of the cereal product; about 10 wt % to about 50 wt % of the cereal product; about 10 wt % to about 45 wt % of the cereal product; about 15 wt % to about 45 wt % of the cereal product; about 20 wt % to about 45 wt % of the cereal product; about 25 wt % to about 45 wt % of the cereal product; or about 30 wt % to about 40 wt % of the cereal product.

In some embodiments, a cereal product includes flour. Suitable flour may include refined flour and/or whole grain flour. In some embodiments, suitable flour may include thermally treated flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

In some embodiments, a cereal product may include any suitable whole grain and/or refined flour such as wheat flour, graham flour, buckwheat flour, oat flour, corn flour, rye flour, barley flour, spelt flour, millet flour, teff flour, triticale flour, amaranth flour, quinoa flour, soft wheat flour, hard wheat flour, durum wheat flour, kamut flour, tapioca flour, sago flour, and legume flours such as garbanzo bean flour.

Soft wheat flour may include soft red flour and/or soft white flour. Terms "soft" and "hard" are understood to refer to the hardness of the grains of *Triticum aestivum* used to make the flour, rather than the species of wheat. Hardness of the grains may be due to density of the endosperm cells. Soft wheat endosperm has a lower density, which corresponds to weaker starch and protein bonds. Consequently, soft wheat grains may be crushed into fine particles, damaging less starch than in hard wheat grains.

In some embodiments, a cereal product includes a refined flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product.

In some embodiments, suitable refined flour may include soft wheat flour, wheat flour with low amounts of damaged starch, and/or thermally treated flour such as thermally treated wheat flour. Wheat flour with low damaged starch means a flour with a content of damaged starch lower than 5.5% of the flour weight. Damaged starch content is the percentage of the starch granules that is physically damaged during the milling operation. It may be measured by AACC 76-31.01 method. Examples of thermally treated wheat flours can be wheat flours treated with various number of heating and cooling cycles or annealed Annealing is a hydrothermal treatment that changes the physicochemical properties of starches by improving crystal growth and by facilitating interactions between starch chains.

In some embodiments, refined wheat flour may be made of specifically selected milling fractions such that the flour has a very low water absorption, under 55%, as measured by Brabender® Farinograph® according to NF-ISO-5530-1 norm. In some embodiments, the selected milling fractions have a small particle size, i.e. the percentage of fine particles under 40 μm is above 50%. In contrast, other cereal fractions like groats, grits or cuts may have a larger particle size, for example about 1-2 mm. The selection of milling fractions can be assisted by granulometry analysis (by laser granulometry or mesh diameter) during milling. The measurement by the Brabender® Farinograph® is normalised under NF-ISO-5530-1 norm. Water absorption is defined in this norm as the quantity of water per 100 g of flour at 14 wt % water content needed to have a dough with a maximal consistency of 500 UF. Consistency is the resistance, expressed in arbitrary units (farinographic units UF), of a dough during kneading inside the Farinograph®, at a constant speed specified in the norm. First, water content of the flour is measured. Then, water is added to the flour, with the quantity of water being calculated so that consistency of the dough is close to 500 UF (480 UF to 520 UF). Flour and water are then kneaded together and measurements are recorded for two dough troughs. A water absorption value is obtained from a combination of these consistency/resistance measurements and the volume of water added to the flour to form the dough.

In some embodiments, a cereal product includes wholegrain flour. In certain embodiments, the wholegrain flour comprises at least two different types of wholegrain flours. Suitable types of wholegrain flours may include but are not limited to wholegrain wheat flour, wholegrain barley flour, wholegrain rye flour, wholegrain spelt flour, wholegrain buckwheat flour, wholegrain oat flour, wholegrain rice flour, wholegrain maize flour, wholegrain millet flour, wholegrain kamut flour, wholegrain sorghum flour, wholegrain teff flour, wholegrain triticale flour, and pseudocereal flour such as amaranth flour and quinoa flour, and mixture thereof. In some embodiments, a cereal product may include whole grain flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product.

In some embodiments, a cereal product includes flakes. Flakes may be formed from any suitable grain, including wheat, rye, buckwheat, oats, barley, spelt, triticale, teff, millet, sorghum, quinoa, amaranth, kamut, durum wheat and combinations thereof or from any suitable legume such as garbanzo bean flakes or corn tapioca or sago flakes. The process of preparing flakes and specific processing conditions may depend on the botanical origin of flakes. Some flakes such as rye or barley or wheat may be understood to mean grains that are hydrated and/or steamed and/or heated, and rolled and thereby flattened into a grain flake. The flakes may consist of entire grain berries, such as whole oat flakes, medium oat flakes, quick cooking oats, or can be milled further to reduce their size. In some embodiments, a cereal product includes flakes in an amount of about 0.1 wt % to about 50 wt % of the cereal product; about 0.5 wt % to about 40 wt % of the cereal product; about 1 wt % to about 35 wt % of the cereal product; about 5 wt % to about 30 wt % of the cereal product; about 10 wt % to about 20 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; about 35 t % of the cereal product; or about 40 wt % of the cereal product.

In some embodiments, a cereal product includes groats, grits, and/or cuts. Groats, grits, and/or cuts may be formed from any suitable grain or seed, including oats, buckwheat, quinoa, amaranth, millet, wheat, barley, spelt, kamut, triticale, sorghum, corn, or rye and combinations thereof. In some embodiments, a cereal product includes groats, grits, and/or cuts in an amount of about 1 wt % to about 50 wt % of the cereal product; about 1 wt % to about 45 wt % of the cereal product; about 1 wt % to about 40 wt % of the cereal product; about 2 wt % to about 35 wt % of the cereal product; about 3 wt % to about 30 w % of the cereal product; about 4 wt % to about 27 wt % of the cereal product; about 5 wt % to about 25 wt % of the cereal product; about 6 wt % to about 20 wt % of the cereal product; about 7 wt % to about 19 wt % of the cereal product; about 8 wt % to about 18 wt % of the cereal product; about 9 wt % to about 17 wt % of the cereal product; about 10 wt % to about 16 wt % of the cereal product; about 1 wt % of the cereal product; about 2 wt % of the cereal product; about 3 wt % of the cereal product; about 4 wt % of the cereal product; about 5 wt % of the cereal product; about 6 wt % of the cereal product; about 7 wt % of the cereal product; about 8 wt % of the cereal product; about 9 wt % of the cereal product; about 10 wt % of the cereal product; about 11 wt % of the cereal product; about 12 wt % of the cereal product; about 13 wt % of the cereal product; about 14 wt % of the cereal product; about 15 wt % of the cereal product; about 16 wt % of the cereal product; about 17 wt % of the cereal product; about 18 wt % of the cereal product; about 19 wt % of the cereal product; about 20 wt % of the cereal product; about 25 wt % of the cereal product; about 27 wt % of the cereal product; about 30 wt % of the cereal product; about 35 wt % of the cereal product; about 40 wt % of the cereal product; about 45 wt % of the cereal product; or about 50 wt % of the cereal product.

In some embodiments, a cereal product includes whole grains in an amount of at least about 1 wt % of the cereal product; at least about 5 wt % of the cereal product; at least about 10 wt % of the cereal product; at least about 15 wt % of the cereal product; at least about 20 wt % of the cereal product; at least about 25 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; at least about 80 wt % of the cereal product; at least about 85 wt % of the cereal product; at least about 90 wt % of the cereal product; about 1 wt % to about 90 wt % of the cereal product; about 5 wt % to about 90 wt % of the cereal product; about 5 wt % to about 95 wt %; about 10 wt % to about 80 wt % of the cereal product; about 15 wt % to about 75 wt % of the cereal product; about 20 wt % to about 70 wt % of the cereal product; about 25 wt % to about 65 wt % of the cereal product; about 30 wt % to about 60 wt % of the cereal product; about 35 wt % to about 55 wt % of the cereal product; or about 40 wt % to about 50 wt % of the cereal product.

In some embodiments, a cereal product includes sugars (such as mono and disaccharides) in an amount of about 0.1 wt % to about 50 wt % of the cereal product; about 1 wt % to about 30 wt % of the cereal product; about 1 wt % to about 25 wt % of the cereal product; about 1 wt % to about 20 wt % of the cereal product; about 5 wt % to about 15 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; or about 50 wt % of the cereal product. In some embodiments, a cereal product includes fructose in an amount of up to about 10 wt % of the cereal product; up to about 15 wt % of the cereal product; or up to about 20 wt % of the cereal product. In some embodiments, no more than about 25% of the total carbohydrates in a cereal product are from fructose.

Protein

Cereal products of the present invention may also include protein. Suitable sources of protein may include but are not limited to high protein wheat flour or flakes such as durum wheat or kamut flours or flakes, legume flours or flakes such as garbanzo bean flour or flakes, pea flour or flakes, soybean flour or flakes, whey protein concentrate or isolate, soybean concentrate or isolate, casein concentrate or isolate, milk protein concentrate and isolate, gluten, hydrolized gluten, or egg protein. Proteins can be formulated in as powders or in a form of protein crisps where crisps are prepared from any protein or combination of proteins and potentially some additional ingredients to form a crispy inclusion similar to rice crisps.

In some embodiments, a cereal product may include protein in an amount of about 0.1 wt % to about 30 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; or about 35 wt % of the cereal product.

Fat

Cereal products of the present invention may include fat in desired amounts. Fat may be added to the cereal product from any suitable source, including but not limited to shortenings and oils.

In some embodiments, a cereal product may include fat in an amount of about 0.1 wt % to about 40 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 35 wt % of the cereal product; or about 40 wt % of the cereal product.

In some embodiments, a cereal product includes canola oil, high oleic canola oil, palm oil, soybean oil, sunflower oil, safflower oil, cottonseed oil, hydrogenated oils, trans-esterified oils or combinations of thereof. The choice of the oil may depend on desired textural and nutritional properties of the cereal product.

Water

In some embodiments, it is desirable to use a minimal amount of water in a cereal product formulation. In some embodiments, using lower amounts of water may result in lower levels of starch gelatinization, and therefore higher SAG levels in the finished product. In some embodiments, the amount of water included in a formulation is determined by the amount necessary to provide suitable dough rheology for processing and moistness in the final product. In some embodiments, water may be replaced by solvents and/or plasticizers that may mimic water behaving during processing. Examples of suitable water replacements may include propylene glycol and/or ethyl alcohol.

Water may be added to a dough in an amount about 1 wt % to about 10 wt % of the dough; about 1 wt % to about 7 wt % of the dough; about 3 wt % to about 7 wt % of the dough; about 2 wt % to about 6 wt % of the dough; about 3 wt % to about 8 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; or about 10 wt % of the dough.

In some embodiments, a dough has a moisture content of about 1 wt % to about 18 wt % of the dough; about 2 wt % to about 14 wt % of the dough; about 8 wt % to about 14 wt % of the dough; about 3 wt % to about 10 wt % of the dough; about 4 wt % to about 6 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; or about 10 wt % of the dough.

In some embodiments, a unbaked cereal product has a moisture content of about 1 wt % to about 18 wt % of the unbaked cereal product; about 2 wt % to about 14 wt % of the unbaked cereal product; about 8 wt % to about 14 wt % of the unbaked cereal product; about 3 wt % to about 10 wt % of the unbaked cereal product; about 4 wt % to about 6 wt % of the unbaked cereal product; about 1 wt % of the unbaked cereal product; about 2 wt % of the unbaked cereal product; about 3 wt % of the unbaked cereal product; about 4 wt % of the unbaked cereal product; about 5 wt % of the unbaked cereal product; about 6 wt % of the unbaked cereal product; about 7 wt % of the unbaked cereal product; about 8 wt % of the unbaked cereal product; about 9 wt % of the unbaked cereal product; or about 10 wt % of the unbaked cereal product.

In some embodiments, a baked cereal product has a moisture content of about 0.5 wt % to about 5 wt % of the cereal product; about 1 wt % to about 4 wt % of the cereal product; about 1.5 wt % to about 3 wt % of the cereal product; about 0.5 wt % of the cereal product; about 1 wt % of the cereal product; about 1.5 wt % of the cereal product; about 2 wt % of the cereal product; about 2.5 wt % of the cereal product; about 3 wt % of the cereal product; about 3.5 wt % of the cereal product; about 4 wt % of the cereal product; about 4.5 wt % of the cereal product; or about 5 wt % of the cereal product.

In some embodiments, a baked cereal product has a water activity of about 0.3 or less; about 0.2 or less; about 0.1 to about 0.3; about 0.1; about 0.2; about 0.3; or about 0.4.

Inclusions

Cereal products of the present invention may include suitable inclusions. Inclusions may provide textural, aesthetic, as well as nutritional benefits. In cereal products of some embodiments of the present invention, an inclusion is understood to be a component of the cereal product that does not become part of the gluten or dough matrix. Such inclusions may be visually or texturally distinguishable as an entity in a cereal product. In some embodiments, a cereal product may contain inclusions such as fruit, grains, pseudograins, and/or seeds, such as oats, buckwheat, rye, barley, spelt, kamut, wheat, spelt, buckwheat, millet, sorghum, kamut, triticale, quinoa, and/or amaranth. These inclusions can come in variety forms, e.g., groats, grits flakes; rice crisps, protein crisps (whey, soy, casein or combinations) and/or chocolate chips, nougat, caramel inclusions, crisps (protein, rice, etc.) any other suitable inclusion, or combinations thereof. Suitable grain inclusions may include those grains and seeds in amounts described in the Carbohydrate section above. Suitable fruit inclusions may include but are not limited to blueberries, strawberries, raspberries, bananas, peaches, raisins, cranberries and the like.

In some embodiments, formulations and methods of the present invention allow for high levels of certain inclusions while maintaining high SAG content in the baked cereal product, even where such inclusions themselves have little or no SAG content. For example, fruit may have little or no SAG content.

In some embodiments, a cereal product includes inclusions in an amount of about 5 wt % or more of the cereal product; about 10 wt % or more of the cereal product; about 15 wt % or more of the cereal product; about 20 wt % or more of the cereal product; about 25 wt % or more of the cereal product; about 30 wt % or more of the cereal product; about 35 wt % or more of the cereal product; about 40 wt % or more of the cereal product; about 5 wt % to about 50 wt % of the cereal product; about 5 wt % to about 45 wt % of the cereal product; about 5 wt % to about 40 wt % of the cereal product; about 5 wt % to about 35 wt % of the cereal product; about 5 wt % to about 30 wt % of the cereal product; about 5 wt % to about 25 wt % of the cereal product; about 7 wt % to about 23 wt % of the cereal product; about 10 wt % to about 20 wt % of the cereal product; about 12 wt % to about 18 wt % of the cereal product; about 5 wt % of the cereal product; about 7 wt % of the cereal product; about 10 wt % of the cereal product; about 12 wt % of the cereal product; about 15 wt % of the cereal product; about 18 wt % of the cereal product; about 20 wt % of the cereal product; about 23 wt % of the cereal product; about 25 wt % of the cereal product; about 30 wt % of the cereal product; about 35 wt % of the cereal product; about 40 wt % of the cereal product; about 45 wt % of the cereal product; or about 50 wt % of the cereal product.

In some embodiments, inclusions may contribute to the SAG content of the baked cereal product. In some embodiments, inclusions may be selected for their high SAG value, as well as their ability to maintain the SAG content during processing of the baked cereal product. Some grains, such as wheat, may have high initial SAG content, but may lose a substantial amount of SAG during processing due to processing conditions. For example, in cases where higher levels of moisture in the dough and heat are used in preparation of the baked cereal product, such conditions may cause the starch grains having a high natural SAG content to gelatinize thus producing a final product with a low SAG content. It has been found, however, that certain grains and seeds are able to maintain a higher percentage of their SAG content even during processing with shear, higher moisture levels, and/or heat. For example, buckwheat and spelt have high initial SAG values that are substantially maintained during preparation of the baked dough piece. Such grains and/or seeds may be included in any desirable form, including groats, grits, cuts, flakes, and the like.

In some embodiments, inclusions may contribute to the texture of the baked cereal product. In some embodiments, inclusions may be selected in order to provide an inclusion texture that is distinct from the overall texture of the baked cereal product. For example, it may be desired to select inclusions which provide a texture that is crunchy, crispy, or chewy, without being overly hard or toothpacking Such textures may be in contrast to the texture of the baked product matrix and thereby create a dual-texture experience. In some embodiments, it may be desirable to avoid inclusions which absorb moisture from the product matrix to become displeasingly chewy while possibly causing the product to become overly dry and crumbly. Buckwheat grits, for example, may resist moisture migration from the baked cereal product and retain a crunchy texture. In some embodiments, preferred inclusions maintain their distinct texture and/or the dual texture of the baked cereal product over a shelf life of the baked cereal product, such as a shelf life of at least about 1 month; about 2 months; about 3 months; about 6 months; about 9 months; about 1 year; about 1.5 years; or about 2 years. Examples of inclusions which provide a distinct crunchy texture include buckwheat grits, buckwheat groats, wholegrain buckwheat cuts, and hulled whole millet. Oat bits may also be acceptable, and may provide a more chewy/dense rather than crunchy texture.

In some embodiments, the particle size of the inclusions may affect the texture of the inclusions. For example, in some embodiments a desirable texture is associated with inclusions having 85% of their particles in a particle size range of about 1 mm to about 2 mm.

In some embodiments, inclusions may contribute to the SAG content as well as provide a desirable texture. Examples include, but are not limited to, buckwheat grits, buckwheat groats, wholegrain buckwheat cuts, and/or hulled whole millet.

Additional Components

Cereal products of some embodiments may also include ingredients such as emulsifiers, buffering agents, leavening agents, seasoning, preservatives and sweeteners. Suitable leavening agents may include but are not limited to ammonium bicarbonate, sodium bicarbonate, sodium acid pyrophosphate or mixtures thereof. In one embodiment, a cereal product includes a combination of ammonium bicarbonate, sodium bicarbonate, and sodium acid pyrophosphate. In another embodiment, a cereal product includes a combination of sodium bicarbonate and sodium acid pyrophosphate.

Additional ingredients may include vitamins or minerals such as vitamin B1, B2, B3, B6, B12, iron, magnesium, calcium or mixtures thereof. Cereal products may also include salt, flavoring agents such as vanilla, cocoa powder, milk and dairy derivatives, honey.

Dough Rheology

In some embodiments, dough is formulated to have a desired rheology, resulting in characteristics beneficial for processing and resulting in the desired final product properties. In some embodiments, the dough has an unbaked density of from about 1.0 to about 1.5 $g/cm^3$; from about 1.1 to about 1.4 $g/cm^3$; or from about 1.2 to about 1.3 $g/cm^3$. That is, in some embodiments, the combination of ingredients is such that when pressed into the form of a desired unbaked cereal product shape, the dough has a density of from about 1.0 to about 1.5 $g/cm^3$. In some embodiments, the combination of ingredients in a dough having a density of from about 1.0 to about 1.5 $g/cm^3$, and/or the rheology and particle size properties described below, includes refined wheat flour made of specifically selected milling fractions such that the flour has a very low water absorption, under 55%, as measured by Brabender® Farinograph® according to NF-ISO-5530-1 norm. This density may provide cohesion to the dough that leads to a final product with a desirable texture and strength. When the density of the dough is lower, the texture of the cereal product may be softer and the cereal product may be less able to form a cohesive structure and may be more prone to damage in transit. When the density of the dough is higher, such as from about 1.3 to about 1.5 $g/cm^3$, it may be possible to employ less fat in the dough and still obtain a coherent cereal product. However, as the density of the cereal product increases, it may be overly hard and less desirable to the consumer. In some embodiments, the dough density before moulding is about 0.7 $g/cm^3$.

The compression may be quantified by calculating the density, i.e. the mass per unit volume, of the dough in the rotary mould. This is done by dividing the weight of a dough piece (straight after rotary moulding) by the volume of the rotary mould. In some embodiments, the density of dough after compression in the rotary mould is preferably between about 1.2 and about 1.3 $g/cm^3$.

In some embodiments, the dough preferably has a particle size distribution such that at least about 20 wt %; about 30 wt %; about 50 wt %; or about 70 wt % of the dough passes through a vibrating sieve mesh of 10 mm. In some embodiments, the dough preferably has a particle size distribution such that at least about 8 wt %; at least about 10 wt %; or at least about 15 wt % of the dough passes through a vibrating sieve mesh of 2 mm. The particle size distribution can preferably be determined using five graded sieves having meshes of 10, 8, 6.3, 4 and 2 mm, wherein the sieves are vibrated with a sieve acceleration of about 1.5 mm/"g" for a duration of 3 minutes. The value "g" is the standard gravity constant (g=9.81 m·$s^{-2}$). A suitable machine for performing the sieving is a Vibratory Sieve Shaker AS 200 Control (RETSCH, Germany) and the various test parameters and units are well known in the art. A sample size for performing the analysis is preferably about 800 g.

In some embodiments, the dough has a particle size distribution such that the D10 of the dough mass distribution is at most about 6 mm, preferably at most about 3 mm. This is measured by calculating the cumulated particle size distribution against the mesh size and taking the mesh size value that corresponds to 90% of the dough distribution.

In some embodiments, the dough requires a pressure of at least about 5000 $kg/m^2$ to be compressed to a density of about 1.22 $g/cm^3$. In some embodiments, the pressure required to compress the dough to a density of about 1.22 $g/cm^3$ is from about 6500 to about 30000 $kg/m^2$; or from about 7500 to about 15000 $kg/m^2$. The pressure required to compress the dough is preferably measured using a cylindrical pot having a diameter of about 5.2 cm, wherein about 100 g of dough is introduced into the pot and the dough is compressed into the pot by a circular plate having a diameter of about 5 cm and connected to a force-meter, and wherein the circular plate advances at a rate of about 0.7 mm/s, wherein the force required to achieve a calculated density of about 1.22 $g/cm^3$ is recorded. The force is then converted into a pressure value by dividing by the surface of the plate.

Filling

Cereal products of the present invention may also include a filling, for example, to create a cereal product with a layer of filling or a sandwich snack. Any suitable filling may be included, such as sweet or savory fillings. In some embodiments, suitable fillers may be fat or sugar based. In some embodiments, a suitable filling is formulated to provide the desired nutritional, textural and/or flavor properties for the sandwich cereal snack. A filling may be added to the cereal product in any suitable manner, and in some embodiments, the filling is added after baking the cereal product.

In some embodiments, a sandwich cereal snack includes about 20 wt % to about 40 wt % filling; about 25 wt % to about 35 wt % filling; about 28 wt % to about 30 wt % filling; about 20 wt % filling; about 25 wt % filling; about 28 wt % filling; about 30 wt % filling; about 35 wt % filling; or about 40 wt % filling.

Preparation

In some embodiments, cereal products of the present invention may be prepared according to any suitable method, such as those employed in traditional biscuit preparation, while still maintaining a desired SAG level in the finished product.

Cereal products of some embodiments of the present invention may be prepared according to conditions suitable for achieving the desired levels of SAG in the finished cereal product. In some embodiments, higher SAG content is achieved by using low shear processing conditions. In some embodiments, processing conditions are chosen to minimize damage to the starch in the cereal product formulation. In some embodiments, cereal products of the present invention may be prepared according to the methods described in WO2012/155154, which is incorporated by reference in its entirety herein.

In some embodiments, ingredients are mixed to prepare a dough. In certain embodiments, ingredients are mixed at low speeds, for example in a double arm mixer, in order to prevent damage to the starch in the formulation. In some embodiments, ingredients of a cereal product formulation are mixed in an order which may help maintain a higher SAG content in the baked cereal product. For example, in some embodiments, water is mixed with fats, sweeteners and emulsifiers to create an emulsion before mixing in the grains of the formulations, such as flour or flakes. Creation of an emulsion before adding the grains may coat the grains with fats from the emulsion, thereby creating a barrier against water and helping to minimize uniform hydration during forming and gelatinization during baking the cereal product.

In some embodiments, the dough is then rotary moulded to prepare dough pieces. For example, rotary moulding may allow the addition of less water to a dough than sheeting. Rotary moulding may be possible with a drier dough than sheeting, and may require different dough elasticity and rheology. Additionally, rotary moulding may result in less starch damage and starch gelatinization than high shear extrusion typically used to produce snacks. Rotary moulding generally does not involve the high pressure and temperatures associated with extrusion. Rotary moulding may aid with maintaining a high SAG content in the baked cereal product. During rotary moulding, in some embodiments, a relatively dry dough with no or minimum gluten development is fed to the hopper and then formed using rotary moulder to produce dough pieces of desired shape, form, thickness and piece weight.

Dough pieces may also be formed by any other suitable method, including pan baking, wire cutting, sheeting and cutting with the reciprocal cutter.

The pieces may be transferred to the belt conveyer and further to the oven for baking or a dryer for drying.

The formed dough pieces may then be baked or dried to a desired moisture content. In some embodiments, a baked cereal product has a moisture content of about 0.5 wt % to about 5 wt % of the cereal product; about 1 wt % to about 4 wt % of the cereal product; about 1.5 wt % to about 3 wt % of the cereal product; about 0.5 wt % of the cereal product; about 1 wt % of the cereal product; about 1.5 wt % of the cereal product; about 2 wt % of the cereal product; about 2.5 wt % of the cereal product; about 3 wt % of the cereal product; about 3.5 wt % of the cereal product; about 4 wt % of the cereal product; about 4.5 wt % of the cereal product; or about 5 wt % of the cereal product.

In some embodiments, the dough pieces are baked according to a temperature profile which helps maintain high SAG content in the baked cereal product. In some embodiments, a dough piece is baked such that an internal temperature of the dough piece remains below the gelatinization temperature of the starch in the dough piece. In some embodiments, a dough piece is baked such that an internal temperature of the dough piece remains below about 100° C. during an initial baking stage. In some embodiments, an initial baking stage is about 10 minutes; about 8 minutes; about 5 minutes; about 3 minutes; about 2 minutes; or about 1 minute. A bake profile including an initial stage wherein the internal temperature of the cereal product remains below 100° C. may prevent gelatinization of the starch in the cereal product, and therefore result cereal product with desired SAG content. An example of processing conditions in a hybrid (a combination of direct gas fire and forced air convection) oven is below:

In some embodiment, the airflows in the oven may be adjusted to bake a product with desired color and moisture level. Internal product temperature during baking may be measured, for example, by a thermal profile instrument such as the M.O.L.E by ECD®.

In some embodiments, a cereal product may be coated and/or seasoned. In some embodiments, a filling may be added to the cereal product. In some embodiments, a cereal product may be cooled and then packaged.

SAG

As described above, SAG content in a baked cereal product may be dependent on the formulation as well as the conditions of preparing the cereal product.

As described above, SAG content in a baked cereal product may be dependent on the formulation as well as the conditions of preparing the cereal product.

As described above, SAG refers to the amount of glucose (from starch, including maltodextrins) likely to be available for slow absorption in the human small intestine. Rapidly available glucose (RAG) refers to the amount of glucose likely to be available for rapid absorption in the human small intestine. In the Englyst method, food product samples, such as biscuits, are prepared by manually and roughly grinding one or more representative samples of biscuits or reducing biscuits to particulates by an action simulating chewing. The food product samples are then subjected to an enzymatic digestion by incubation in presence of invertase, pancreatic alpha-amylase and amyloglucosidase under standardized conditions. Parameters such as pH, temperature (37° C.), viscosity and mechanical mixing are adjusted to mimic the gastrointestinal conditions. After an enzymatic digestion time of 20 min, glucose is measured and is labeled RAG. After an additional enzymatic digestion of 100 min (total time of 120 min), glucose is again measured and is labeled available glucose (AV) (AG). SAG is obtained by subtracting RAG from (AV) (AG) (SAG=AV AG−RAG), thus, SAG corresponds to the glucose fraction released between the 20th and the 120th minute. SAG is equivalent to SDS. Free sugar glucose (FSG), including the free glucose and the glucose released from sucrose, as well as maltose, are obtained by separate analysis. Rapidly digestible starch ("RDS") is then obtained as the subtraction of FSG and maltose from RAG (RDS=RAG−FSG−maltose).

In some embodiments, a cereal product of the present invention includes an unbaked SAG in an amount of about

|  | Zone | | | | | | | | |
| --- | --- | --- | --- | --- | --- | --- | --- | --- | --- |
|  | Zone 1 | Zone 2 | Zone 3 | Zone 4 | Zone 5 | Zone 6 | Zone 7 | Zone 8 | Zone 9 |
| Temperature in Oven [C.] | 104 | 104 | 116 | 135 | 193 | 193 | 188 | 177 | 171 |
| Length of Oven [ft] | 33 | 66 | 99 | 132 | 165 | 198 | 231 | 264 | 304 |
| Length of Zone [ft] | 33 | 33 | 33 | 33 | 33 | 33 | 33 | 33 | 40 |
| % of Oven | 11% | 22% | 33% | 43% | 54% | 65% | 76% | 87% | 100% |
| Time Bake [min] | 0.9 | 1.7 | 2.6 | 3.5 | 4.3 | 5.2 | 6.1 | 6.9 | 8.0 |
| Temperature in Product [C.] | 57 | 66 | 78 | 89 | 116 | 128 | 132 | 137 | 125 | in higher SAG content in the baked cereal product.

In some embodiments, an oven temperature may range from about 200° C. to about 300° C., or about 100° C. to about 220° C. during baking Various types of ovens can be adjusted to processing conditions required to produce a 5 g or greater per 100 g of the unbaked cereal product; about 10 g or greater per 100 g of the unbaked cereal product; about 15 g or greater per 100 g of the unbaked cereal product; about 15.8 g or greater per 100 g of the unbaked cereal product; about 16 g or greater per 100 g of the unbaked cereal product; about 17 g or greater per 100 g of the unbaked cereal product; about 18 g or greater per 100 g of the unbaked cereal product; about 19 g or greater per 100 g of the unbaked cereal product; about 20 g or greater per 100 g of the unbaked cereal product; about 21 g or greater per 100 g of the unbaked cereal product; about 22 g or greater per 100 g of the unbaked cereal product; about 23 g or greater per 100 g of the unbaked cereal product; about 24 g or greater per 100 g of the unbaked cereal product; about 25 g or greater per 100 g of the unbaked cereal product; about 26 g or greater per 100 g of the unbaked cereal product; about 27 g or greater per 100 g of the unbaked cereal product; about 28 g or greater per 100 g of the unbaked cereal product; about 29 g or greater per 100 g of the unbaked cereal product; about 30 g or greater per 100 g of the unbaked cereal product; about 31 g or greater per 100 g of the unbaked cereal product; about 32 g or greater per 100 g of the unbaked cereal product; about 33 g or greater per 100 g of the unbaked cereal product; about 34 g or greater per 100 g of the unbaked cereal product; about 35 g or greater per 100 g of the unbaked cereal product; about 35 g or greater per 100 g of the unbaked cereal product; about 37 g per 100 g of the unbaked cereal product; about 38 g per 100 g of the unbaked cereal product; about 39 g per 100 g of the unbaked cereal product; about 40 g per 100 g of the unbaked cereal product.

In some embodiments, a cereal product of the present invention includes a post-baked SAG in an amount of about 5 g or greater per 100 g of the cereal product; about 10 g or greater per 100 g of the cereal product; about 15 g or greater per 100 g of the cereal product; about 15.8 g or greater per 100 g of the cereal product; about 16 g or greater per 100 g of the cereal product; about 17 g or greater per 100 g of the cereal product; about 18 g or greater per 100 g of the cereal product; about 19 g or greater per 100 g of the cereal product; about 20 g or greater per 100 g of the cereal product; about 21 g or greater per 100 g of the cereal product; about 22 g or greater per 100 g of the cereal product; about 23 g or greater per 100 g of the cereal product; about 24 g or greater per 100 g of the cereal product; about 25 g or greater per 100 g of the cereal product; about 26 g or greater per 100 g of the cereal product; about 27 g or greater per 100 g of the cereal product; about 28 g or greater per 100 g of the cereal product; about 29 g or greater per 100 g of the cereal product; about 30 g or greater per 100 g of the cereal product; about 31 g or greater per 100 g of the cereal product; about 32 g or greater per 100 g of the cereal product; about 33 g or greater per 100 g of the cereal product; about 34 g or greater per 100 g of the cereal product; about 35 g or greater per 100 g of the cereal product; about 35 g or greater per 100 g of the cereal product; about 37 g per 100 g of the cereal product; about 38 g per 100 g of the cereal product; about 39 g per 100 g of the cereal product; about 40 g per 100 g of the cereal product.

In some embodiments, a cereal product of the present invention includes a slowly-digestible-starch-over-total-available-starch ratio (SDS/(SDS+RDS)) of at least about 31 wt %; at least about 35 wt %; at least about 38 wt %; or at least about 40 wt %. Total available starch comprises SDS and RDS. As stated above, SAG may be used interchangeably with SDS herein. A difference between total available starch and total starch is that total available starch does not comprise resistant starch that cannot be digested, i.e. that escapes digestion in the small intestine.

In some embodiments, an unbaked SAG content is calculated based on the SAG content of each of the ingredients in a formulation and the weight percent of each of the ingredients in the cereal product. In some embodiments, processing conditions for preparing the baked cereal product minimize damage to the starch and starch gelatinization, thereby resulting in a minimal reduction in SAG content from the unbaked formulation to the post-baked cereal product. In some embodiments, the post-baked SAG content of a cereal product is less than about 50% below the unbaked SAG; less than about 45% below the unbaked SAG; less than about 40% below the unbaked SAG; less than about 35% below the unbaked SAG; less than about 30% below the unbaked SAG; less than about 25% below the unbaked SAG; less than about 24% below the unbaked SAG; less than about 23% below the unbaked SAG; less than about 22% below the unbaked SAG; less than about 21% below the unbaked SAG; less than about 20% below the unbaked SAG; less than about 19% below the unbaked SAG; less than about 18% below the unbaked SAG; less than about 17% below the unbaked SAG; less than about 16% below the unbaked SAG; less than about 15% below the unbaked SAG; less than about 14% below the unbaked SAG; less than about 13% below the unbaked SAG; less than about 12% below the unbaked SAG; less than about 11% below the unbaked SAG; less than about 10% below the unbaked SAG; less than about 9% below the unbaked SAG; less than about 8% below the unbaked SAG; less than about 7% below the unbaked SAG; less than about 6% below the unbaked SAG; less than about 5% below the unbaked SAG; less than about 4% below the unbaked SAG; less than about 3% below the unbaked SAG; less than about 2% below the unbaked SAG; less than about 1% below the unbaked SAG; or is about the same as the unbaked SAG. In certain embodiments, the post-baked SAG content of a cereal product may be higher than the unbaked SAG.

In some embodiments, less than about 15 wt % of the starch in the cereal product is gelatinized; less than about 14 wt % of the starch in the cereal product is gelatinized; less than about 13 wt % of the starch in the cereal product is gelatinized; less than about 12 wt % of the starch in the cereal product is gelatinized; less than about 11 wt % of the starch in the cereal product is gelatinized; less than about 10 wt % of the starch in the cereal product is gelatinized; less than about 9 wt % of the starch in the cereal product is gelatinized; less than about 8 wt % of the starch in the cereal product is gelatinized; less than about 7 wt % of the starch in the cereal product is gelatinized; less than about 6 wt % of the starch in the cereal product is gelatinized; less than about 5 wt % of the starch in the cereal product is gelatinized; less than about 4 wt % of the starch in the cereal product is gelatinized; less than about 3 wt % of the starch in the cereal product is gelatinized; less than about 2 wt % of the starch in the cereal product is gelatinized; or less than about 1 wt % of the starch in the cereal product is gelatinized.

Sensory Characteristics

Cereal products of the present invention may be formulated and/or prepared to include desirable nutritional and sensory attributes. For example, cereal products of the present invention may be formulated and/or prepared to include a high SAG content, while still maintaining desired nutrition and sensory attributes. Desired nutrition may include particular levels of whole grains, fat, and/or sugar as described herein. Sensory attributes may include textural properties. This combination of high SAG, desirable nutrition, and desirable sensory attributes is unexpected, as products with high SAG values and/or desirable nutrition attributes are often associated with undesirable sensory attributes, such as an overly harder or softer texture.

In some embodiments, sensory attributes are quantified by measuring hardness in bite intensities, crunchiness, crumbliness, granulometry, fat in mouth intensities, lightness, dryness, shortbread, stickiness, and/or melting perceptions of the cereal product, using a sensory test according to the guidelines ISO 13299:2003 "Sensory analysis—Methodology—General guidance for establishing a sensory profile". Such sensory evaluations and have been shown to be reproducible and discriminating. As used herein, hardness in bite is a primary parameter of texture defined according to guidelines ISO 11036:1994 "Sensory analysis—Methology—Texture profile", evaluated by sensory experts using the technique described in the same guidelines. The intensity of hardness in bite is measured using a unstructured continuous scale from 0 to 60; 0 being labeled 'weak' and 60 being labeled 'intense." Reference products used for such scale in the hardness in bite evaluation were as follows: Croissant de Lune, Balsen as a product with a weak hardness in bite; Veritable Petit Beurre, LU as a product with intermediate hardness in bite; and Bastogne, LU as a product with an intense hardness in bite.

In some embodiments, cereal products have a hardness in bite intensity of about 21.5 to about 41 about 25 to about 41; about 26 to about 37.8; about 26.4 to about 37.8; about 35 to about 40; about 25 to about 40; about 21.5 to about 40; about 21.5; about 22; about 25; about 26; about 26.4; about 27.3; about 28; about 30; about 31.4; about 32; about 32.1; about 34; about 34.8; about 36; about 37; about 38; about 40; or about 41. In some embodiments, such hardness in bite intensities are measured for a cereal product at a shelf life of between about 2 weeks to about 6 months; at about 1 month and about 5 months; at about 1 month; at about 2 months; at about 3 months, at about 4 months, at about 5 months; or at about 6 months.

In some embodiments, a cereal product includes an SAG content of at least about 15 g per 100 g of the cereal product and a hardness in bite intensity of about 25 to about 40. In some embodiments, a cereal product includes an SAG content of at least about 15 g per 100 g of the cereal product, a hardness in bite intensity of about 25 to about 40, and whole grains in an amount of at least about 15 wt % of the cereal product. In some embodiments, a cereal product includes an SAG content of at least about 15 g per 100 g of the cereal product, a hardness in bite intensity of about 25 to about 40, about 29 wt % wholegrain cereal flour, about 5 wt % to about 22 wt % fat, and at most about 30 wt % sugar relative to the total weight of the cereal product.

The following examples, wherein all parts, percentages, and ratios are by weight, and all temperatures are in ° F. unless indicated to the contrary, illustrate some embodiments of the present invention:

EXAMPLES

Example 1

Cereal products were prepared according to the following formulations:

| Ingredients | Control (wt % of dough) | GRITS 6% (wt % of dough) | GRITS 8% (wt % of dough) |
|---|---|---|---|
| Wheat flour | 51.3% | 49.2% | 47.2% |
| Wholegrain flour blend with bran | 6.5% | 6.5% | 6.5% |
| Salt | <1% | <1% | <1% |
| Leavening | <2% | <2% | <2% |
| Sugar | 16.6% | 16.6% | 16.6% |
| Oil with lecithin | 12.2% | 12.2% | 12.2% |
| Oat flakes | 4.1% | 0.0% | 0.0% |
| Buckwheat Grits | 0.0% | 6.1% | 8.1% |
| Emulsifier | <1% | <1% | <1% |
| Milk and whey powders | <2% | <2% | <2% |
| Flavors | <1% | <1.0% | <1.0% |
| Water | <6% | <6% | <6% |

As noted in the chart above, the standard formulation includes oat flakes and wheat flour, the 6% grits formulation includes buckwheat grits to replace 4.1% of oat flakes and 2% of wheat flour from the standard formulation, and the 8% grits formulation includes buckwheat grits to replace 4.1% of oat flakes and 4% of wheat flour from the standard formulation.

The RAG, SAG, and ratio of SAG to total available starch ("TAS") were measured/calculated for each formulation:

| Formulation | RAG | SAG | SAG/TAS |
|---|---|---|---|
| Standard recipe | 32.8 | 17.8 | 35% |
| 6% grits | 31.3 | 20.6 | 40% |
| 8% grits | 31.1 | 20.7 | 40% |

The results show that replacing flour and oat flakes with buckwheat grits results in a higher SAG level and SAG/TAS ratio than the standard formulation, as they have a high original SDS value and resist damage and gelatinization during processing.

Example 2

Cereal products were prepared according to the following formulations:

| | Ingredients | | | |
|---|---|---|---|---|
| | Grits 3.2% % | Grits 5% % | Grits 6.5% % | Grits 8% % |
| Whole grain flour blend | 10.0 | 10.0 | 10.0 | 10.0 |
| Wheat flour and wheat bran | 34.0 | 34.0 | 34.0 | 34.0 |
| Wheat starch | 2.0 | 2.0 | 2.0 | 2.0 |
| Quick cooking oats | 4.2 | 2.4 | 1.0 | 1.0 |
| Buckwheat grits | 3.2 | 5.0 | 6.5 | 8.0 |
| Vegetable oil | 8.0 | 8.0 | 8.0 | 8.0 |

-continued

| Ingredients | Grits 3.2% % | Grits 5% % | Grits 6.5% % | Grits 8% % |
|---|---|---|---|---|
| Chocolate drops | <11 | <11 | <11 | <11 |
| Cocoa powder | <3 | <3 | <3 | <3 |
| Sugar | 16.0 | 16.0 | 16.0 | 16.0 |
| Salt | <1 | <1 | <1 | <1 |
| Emulsifiers | <1 | <1 | <1 | <1 |
| Leavening agents | <2 | <2 | <2 | <2 |
| Flavor | <1 | <1 | <1 | <1 |
| Water | 8 | 8 | 8 | 8 |

As noted in the chart above, oat flakes and wheat flour are replaced in the noted amounts for each formulation by buckwheat grits.

The RAG, SAG, and ratio of SAG to total available starch ("TAS") were measured/calculated for each formulation:

| Formulation | RAG | SAG | SAG/TAS |
|---|---|---|---|
| 3.3% grits | 23.0 | 18.8 | 45.0% |
| 5% grits | 21.2 | 20.1 | 48.6% |
| 6.5% grits | 20.6 | 21.1 | 50.5% |
| 8% grits | 20.0 | 21.4 | 51.8% |

The results show that replacing quick cooking oats with buckwheat grits results in a higher SAG level and SAG/TAS ratio than the standard formulation, as they resist damage and gelatinization during processing.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention.

As used herein, the term "about" is understood to mean±10% of the value referenced. For example, "about 45%" is understood to literally mean 40.5% to 49.5%.

We claim:

1. A baked cereal product comprising:
a slowly available glucose (SAG) content of greater than about 15 g per 100 g of the baked cereal product, a moisture level of less than about 5 wt % of the baked cereal product, a water activity of about 0.3 or less, a total flour content consisting essentially of refined flour and whole grain flour, wherein the refined flour is present in an amount of about 40 wt % to about 60 wt % of the baked cereal product and wherein the whole grain flour is present in an amount up to 6.5 wt % of the baked cereal product, and seeds in the form of grits, cuts, or combinations thereof, and wherein the seeds in the form of grits, cuts, or combinations thereof contribute to the SAG content of the baked cereal product and are present in an amount of 3 wt % to 25 wt % and wherein the total flour content consists essentially of wheat flour.

2. The baked cereal product of claim 1, comprising an SAG content of greater than about 20 g per 100 g of baked cereal product.

3. The baked cereal product of claim 1, having a ratio of SAG to total available starch (SAG/TAS ratio) of about 40% or greater, wherein the SAG/TAS ratio is at least 5% greater than a SAG/TAS ratio of a baked cereal product comprising refined wheat flour and oat flakes in place of the seeds in the form of grits, cuts, or combinations thereof.

4. The baked cereal product of claim 1, wherein in the baked cereal product is dough-based.

5. The baked cereal product of claim 4, wherein the cereal product has an unbaked SAG content and a post-baked SAG content, and wherein the post-baked SAG content is less than about 25% below the unbaked SAG content.

6. The baked cereal product of claim 5, wherein the post-baked SAG content is less than about 10% below the unbaked SAG content.

7. The cereal product of claim 1, wherein the cereal product comprises protein in an amount of about 0.1 wt % to about 20 wt % of the weight of the cereal product.

8. The baked cereal product of claim 1, wherein the cereal product comprises fat in an amount of about 0.1 wt % to about 20 wt % of the weight of the cereal product.

9. The cereal product of claim 1, further including inclusions.

10. The cereal product of claim 9, wherein the inclusions comprise fruit, grains, oats, rye flakes and/or chocolate chips.

11. A method for preparing a baked cereal product comprising:
(a) preparing a dough comprising refined flour in an amount of about 40 wt % to about 60 wt % and up to 6.5 wt % whole grain flour, and seeds in the form of grits, cuts, or combinations thereof, and wherein the seeds in the form of grits, cuts, or combinations thereof are present in an amount of 3 wt % to 25 wt %, and wherein the total flour content consists essentially of wheat flour;
(b) forming the dough to provide a dough piece;
(c) baking the dough piece to provide a baked cereal product having a moisture content of less than about 5 wt %, a water activity of about 0.3 or less, and such that the baked cereal product has a post-baked slowly available glucose (SAG) content of at least about 15 g per about 100 g of the baked cereal product.

12. The method of claim 11, wherein the baked cereal product comprises a SAG content of at least about 17 g per about 100 g of the baked cereal product.

13. The method of claim 11, wherein the baked cereal product has a ratio of SAG to total available starch (SAG/TAS ratio) of about 40% or greater, wherein the SAG/TAS ratio is at least 5% greater than a SAG/TAS ratio of a baked cereal product comprising refined wheat flour and/or oat flakes in place of seeds in the form of grits, cuts, or combinations thereof.

14. The method of claim 11, wherein the dough has a SAG content, and wherein the SAG content of the baked cereal product is less than about 25% below the SAG content of the dough.

15. The method of claim 14, wherein the SAG content of the baked cereal product is less than about 10% below the SAG content of the dough.

16. The method of claim 11, wherein the cereal product comprises protein in an amount of about 0.1 wt % to about 20 wt % of the weight of the cereal product.

17. The method of claim 11, wherein the cereal product comprises fat in an amount of about 0.1 wt % to about 20 wt % of the weight of the cereal product.

18. The method of claim 11, wherein the cereal product further includes inclusions.

19. The method of claim 18, wherein the inclusions comprise fruit, and/or chocolate chips.

20. The baked cereal product of claim 1, wherein the seeds are in the form of grits.

21. The baked cereal product of claim 20, wherein the grits are present in an amount of 3.2 wt % to 15 wt % of the baked cereal product.

22. The method of claim 11, wherein the seeds are in the form of grits.

23. The method of claim 22, wherein the grits are present in an amount of 3.2 wt % to 15 wt % of the baked cereal product.

24. The method of claim 11, wherein the seeds comprise buckwheat in the form of grits, cuts, or combinations thereof.

\* \* \* \* \*